US005088610A

United States Patent [19]

Garnier

[11] Patent Number: 5,088,610

[45] Date of Patent: Feb. 18, 1992

[54] HANDLING MACHINE TO BE SUSPENDED FROM A LIFTING UNIT

[75] Inventor: André Garnier, Loudun, France

[73] Assignee: SIT (Societe D'Innovations Techniques), Chatellerault, France

[21] Appl. No.: 507,395

[22] Filed: Apr. 10, 1990

[30] Foreign Application Priority Data

Apr. 13, 1989 [FR] France ........ 8904912

[51] Int. Cl.[5] ........ B66C 23/76

[52] U.S. Cl. ........ 212/196; 212/205; 212/209; 212/211; 212/221

[58] Field of Search ........ 212/149-150, 212/153-156, 159, 191, 195-198, 211, 227, 232, 242, 247, 251, 255; 294/67.21; 414/146, 607

[56] References Cited

U.S. PATENT DOCUMENTS 2,766,850 10/1956 Marnon et al. ........ 212/196
3,272,347 9/1966 Lemelson ........ 212/129
3,750,804 8/1973 Lemelson ........ 414/280
3,810,551 5/1974 Rust et al. ........ 212/128
4,067,446 1/1978 Ray ........ 212/154
4,259,674 7/1988 Schröder et al. ........ 294/67.21
4,449,634 5/1984 Buzzichelli et al. ........ 212/196
4,668,154 5/1987 Ueno et al. ........ 212/156

FOREIGN PATENT DOCUMENTS 540799 1/1977 U.S.S.R. ........ 294/67.21
1291533 2/1987 U.S.S.R. ........ 212/154

*Primary Examiner*—Joseph F. Peters, Jr.
*Assistant Examiner*—R. B. Johnson
*Attorney, Agent, or Firm*—Pearne, Gordon, McCoy & Granger

[57] ABSTRACT

So as to avoid installing a heavy remote handling machine in a containment comprising a lifting unit, such as a travelling crane, the present invention proposes an autonomous remote handling machine (20) suitable for being suspended from the hook (b 16) of this crane. This machine (20) includes a support (22), a gripping arm (24) and a counterweight (26) being joined to said support around a normally horizontal axis (26). A device (44) detects any possible slanting of the support (22) with respect to vertical in order to control any modification of the orientation of the counterweight (26), independently of the orientation of the arm, so as to annul any detected slanting.

4 Claims, 3 Drawing Sheets

14 16 18 10 12 22 20 12 26 24

10
12
12
14
16
18
20
22
24
26

HANDLING MACHINE TO BE SUSPENDED FROM A LIFTING UNIT

FIELD OF THE INVENTION

The invention concerns an autonomous remote handling machine designed in such a way that it is able to be used in association with a lifting unit, such as a travelling crane, available inside a confinement cell.

BACKGROUND OF THE INVENTION

In the nuclear industry, the need to remotely handle radioactive substances placed in confinement cells has led manufacturers to develop a large number of remote handling devices. These remote handling devices are generally classed into two families constituted by precision remote handlers and heavy handlers.

The family of precision remote handlers includes all those remote handlers including a master arm situated outside the confinement cell and a slave arm situated at a fixed point inside the cell and reproducing the movements of the master arm. Master/slave remote handlers with or without force return belong to this category.

On the other hand, heavy remote handlers are autonomous machines which include a vertical telescopic support column projecting towards the bottom from a carriage suitable for moving along two horizontal directions perpendicular to each other, this support column bearing at its lower extremity at least one gripping arm provided with pliers and generally formed of at least two segments articulated to each other.

Heavy remote handlers are specialized complex costly machines. In addition, the designers of these machines often provide them with a relative precision which frequently is ill-suited to relatively simple tasks generally to be carried out inside confinement cells, said tasks being, for example, the gripping of an object and transferring it from one point to another inside the cell.

The highly specialized nature of heavy remote handlers, their high cost and their large spatial requirement inhibits possible users from deciding to install such a remote handler in a confinement cell.

SUMMARY OF THE INVENTION

The object of the invention is thus to provide a new remote handling machine designed in such a way as to be able to be suspended from any lifting unit, such as a travelling crane, already present inside a confinement cell, and so as to be able to carry out those tasks generally required of heavy remote handlers at a reduced cost without encumbering the space available inside the cell.

According to the invention, this result is obtained by the use of a remote handling machine suitable for being suspended from a lifting unit and characterized by the fact that it includes a support, a gripping arm and at least one counterweight for balancing of this arm being joined to said support; a first device for controlling the orientation of the gripping arm with respect to the support; a second device to control the orientation of the counterweight with respect to the support; and a device to detect any slanting of the support acting on the second orientation control device so as to automatically annul this slanting.

A remote handling machine designed as above may be suspended from any lifting unit present in a confinement cell when the use of said machine is required. As soon as the remote handling machine is no longer required, it can be fitted into a corner of the cell, which frees the available space inside the latter. It is to be noted that the great simplicity of this machine renders the cost of the latter significantly less than the cost of a conventional heavy remote handler, this much lower cost proving to be a significant asset. In addition, it is important to note that, despite its simplicity, the remote handling machine of the invention functions perfectly correctly by virtue of the automatic balancing of the arm effected by the counterweight, whether on off-load or when a load is carried by the gripping arm, even when a force is supported by the latter.

In one preferred embodiment of the invention, the gripping arm and the counterweight are joined around a given axis on the support.

In this embodiment, the first and second orientation control means are back-gear motors mounted on the support and the device for detecting the tilting torque is sensitive to a slanting of the support with respect to vertical.

Advantageously, a potentiometer is connected to each of the orientation control means. By knowing the orientation of the arm with respect to the support, this makes it possible to automatically balance the support before laying down a load, which then avoids any risk of the machine oscillating with respect to the lifting unit from which it is suspended.

The support may be made up to two sections having available between them a degree of freedom of rotation around an axis perpendicular to the hinge pin of the gripping arm and provided so as to be orientated vertically. The corresponding movement of rotation is then controlled by a suitable control device mounted in the support.

BRIEF DESCRIPTION OF THE DRAWINGS

There now follows a description of one preferred embodiment of the invention, given by way of example and being in no way restrictive, and with reference to the accompanying drawings in which.

DETAILED DESCRIPTION OF THE PREFERRED EMBODIMENT

Figure 1:
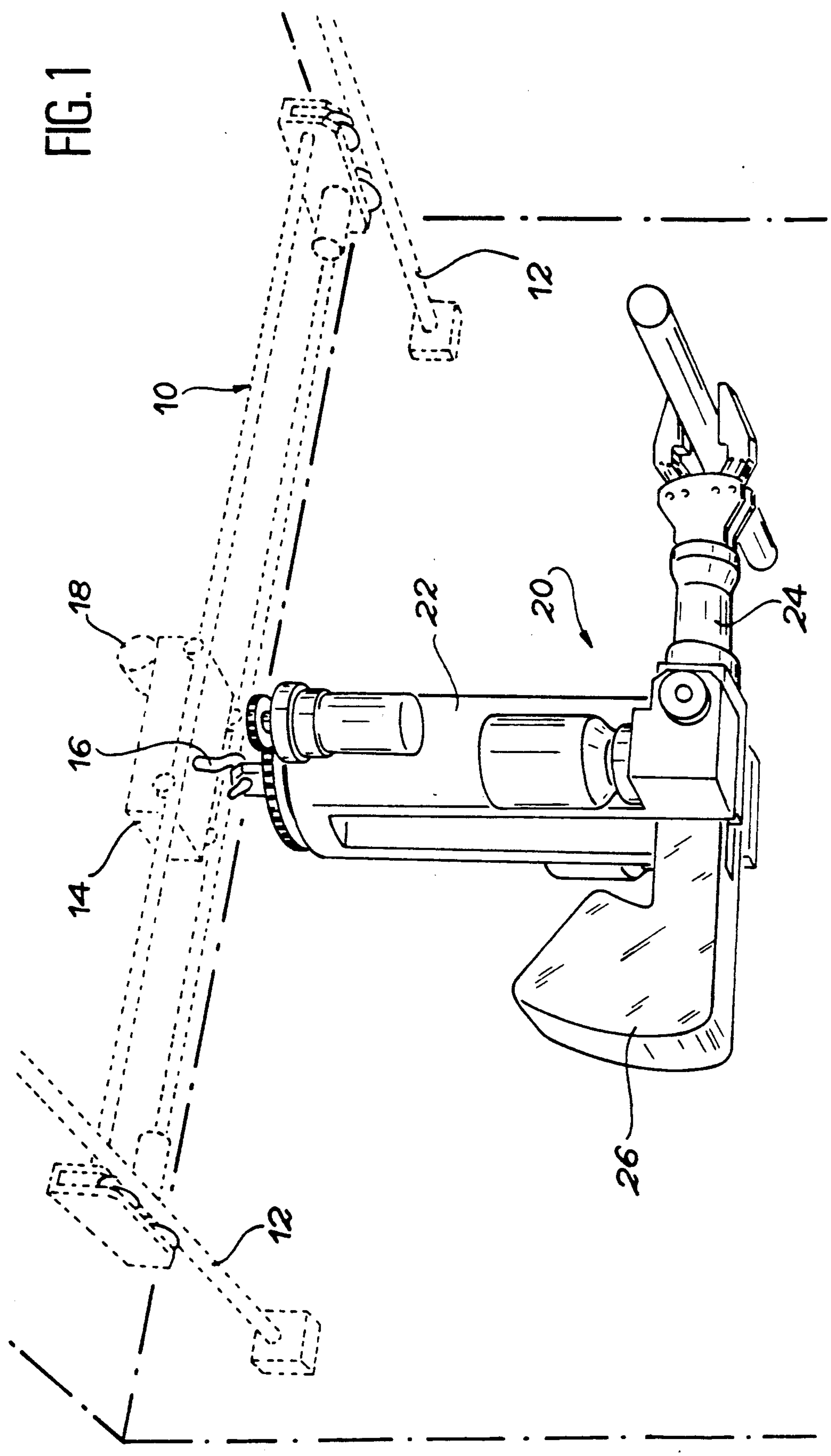
FIG. 1 is a perspective view diagrammatically representing the implanting of a remote handling machine according to the invention inside a confinement cell.

FIG. 1 shows one section of a confinement cell of a nuclear installation. Such a cell is usually equipped with a lifting unit constituted by a travelling crane 10 represented by the broken lines on FIG. 1, but which, in certain cases, may be of a different kind.

The travelling crane 10 is able to move along a first horizontal direction on rails 12 and supports a carriage 14 suitable for moving on the crane 10 along a horizontal direction perpendicular to the direction defined by the rails 12. The carriage 14 supports a lifting hook 16 via a cable (not shown) able to be wound or unwound at will on a winch 18 supported by the carriage.

According to the invention, a remote handling machine 20 is proposed which is permanently stored inside the confinement cell so as to be suspended from the hook 16 of the travelling crane when it is desired to carry out inside the cell a task comparable to any task able to be effected by a heavy remote handler.

Figure 2:
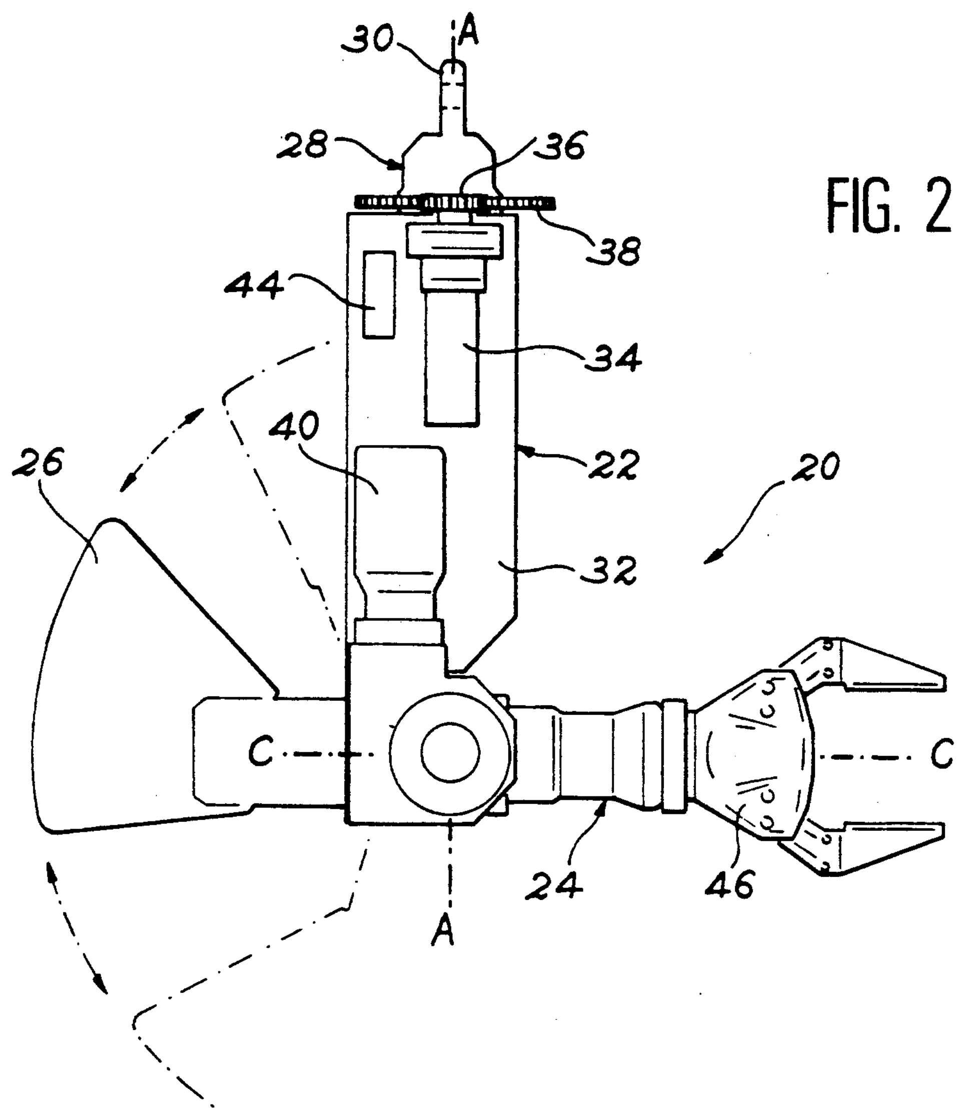
FIG. 2 is a side view of the remote handling machine of the invention.
Figure 3:
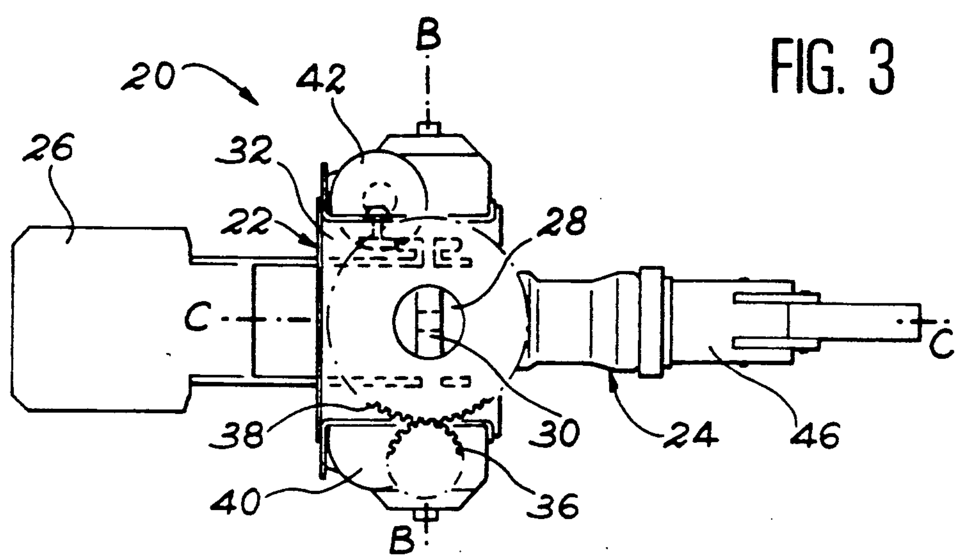
FIG. 3 is a top view of the remote handling machine of FIG. 2.

The remote handling machine 20, to be described in more detail with reference to FIGS. 2 and 3, is mainly composed of a support 22 suitable for being suspended from the hook 16, a gripping arm 24 and a balancing counterweight 26, both being articulated around a given axis on the support 22.

The support 22 comprises an upper section 28 equipped at its upper extremity with a gripping ring 30 into which the hook 16 of the travelling crane is able to penetrate.

The support 22 further includes a lower section 32 roughly having the shape of an upside down "U" so as to form a cover. This lower section 32 of the support 22 has available a degree of freedom around an axis AA with respect to the upper section 28, the axis AA being provided so as to be orientated vertically when the gripping arm 24 is balanced by the counterweight 26, as shown on the figures.

The lower section 32 of the support 22 bears a back-gear motor 34 at the top of one of the lateral branches of the inverted "U" formed by this section 32. The upper output shaft of the back-gear motor 34, with an axis parallel to the axis AA, bears a pinion gear 36 which gears on a toothed wheel 38 centered on the axis AA. The toothed wheel 38 is secured to the upper section 28 of the support 22.

The inverted "U"-shaped lower section 32 of the support 22 forms a cover at the lower extremity from which articulated around an axis BB perpendicular to the axis AA are the gripping arm 24 and the balancing counterweight 26. However, the gripping arm 24 and the balancing counterweight 26 may pivot independently of each other around this axis BB. The recess formed inside the "U" formed by the section 32, as well as the counterweight, have dimensions enabling the latter to pivot freely inside the section 32, as shown by the dot-and-dash lines on FIG. 2.

One of the branches of the inverted "U" formed by the lower section 32 of the support 22 bears close to the axis BB a back-gear unit 40 whose lower output shaft, orientated parallel to the axis AA, controls the pivoting of the gripping arm 24 around the axis BB by means of a transmission mechanism, such as a set of pinion gears (not shown).

To ensure an automatic balancing of the gripping arm 24 by the counterweight 26, whether on off-load or carrying a load and whether or not an external force is applied, the back-gear motor 42 controlling the orientation of the counterweight 26 around the axis BB is sensitive to a signal delivered by means 44 able to detect a slanting or tilting of the entire machine around an axis ring 30.

These detection means 44 may be embodied in various ways. In particular, these means may be sensitive to a slanting of the support 22 with respect to vertical so as to continuously bring back the axis AA of the support to vertical by acting on the back-gear motor 42 controlling the pivoting of the counterweight 26 around the axis BB.

Thus, the detection means 44 may include, in one of the branches of the lower inverted "U"-shaped section of the support 22, a pendulum-type device comprising a suspended weight used to determine what is strictly vertical and a potentiometer sensitive to the relative angular position of the suspended weight with respect to the axis AA. This potentiometer produces a signal representative of the slanting of the support 22 with respect to vertical and this signal is used to feed the back-gear motor 42 so that the latter is automatically activated until the axis AA once again becomes vertical. The angular displacement of the counterweight 26 controlled by the back-gear motor 42 is controlled by a potentiometer (not shown).

The detection means 44 may also include a contact level instrument, such as a mercury type leveller, or strain gauges placed between the upper section 28 and lower section 32 of the support 22.

A potentiometer (not shown) is also preferably to be connected to the back-gear motor unit 40 so as to measure the angular position of the gripping arm 24 around the axis BB. A knowledge of the angular position of the arm 24, immediately before the laying down of a load borne by this arm, makes it possible to ensure off-load balancing with the aid of the counterweight 26 without the risk of any ill-timed tilting of the machine at the moment the load is released.

Figure 4:
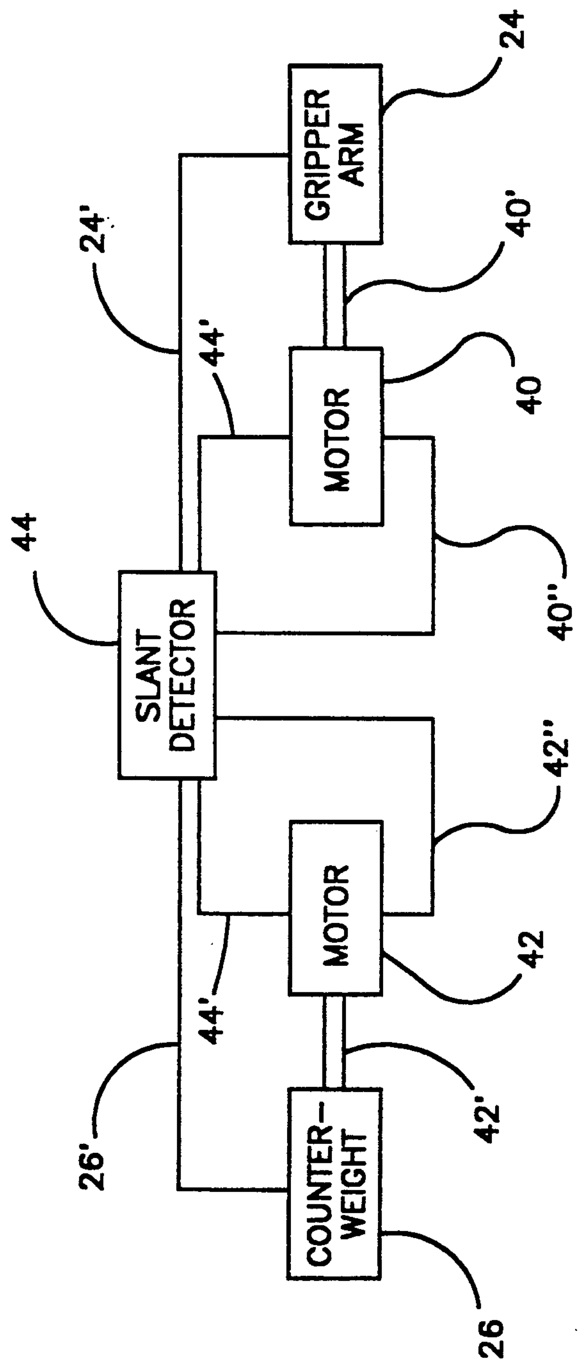
FIG. 4 is a block diagram of a machine according to the invention.

Referring to FIG. 4, the detection means 44 is connected to the counterweight 26 by a signal/connection 26'. The counterweight 26 is driven by the back-gear motor 42 via a drive connection 42'. The back-gear motor 42 is connected to the detection means by control lines 42'', 44'. The detection means 44 is connected to the gripper arm 24 by a signal/connection 24'. The gripper arm 24 is driven by the back-gear motor 40 via a drive connection 40'. The back-gear motor 40 is connected to the detection means 44 by control lines 40'', 44'.

In the embodiment shown on the figures, the gripping arm 24 comprises gripping pliers 46 having a clamping movement and a degree of freedom around the actual axis CC of the arm, which passes by the point of intersection of the axes AA and BB. The back-gear motors (not shown) controlling these two movements are placed inside the arm 24.

If required, the gripping arm 24 may be provided with additional degrees of freedom favoring the carrying out of certain particular tasks.

A cabling system (not shown) traversing the wall of the confinement cell connects each of the back-gear motors 34 and 40, as well as the back-gear motors controlling the clamping and pivoting movements of the pliers 46, to a control system placed outside the cell.

An electrodynamic safety element (not shown) is incorporated inside the upper section 28 of the support 22 so as to match the force of the remote handling machine with the capacity of the lifting unit from which it is suspended.

Furthermore, the various back-gear motors 34, 40 and 42 are interchangeable by means of a remote handler.

Of course, the invention is not merely restricted to the embodiment described above by way of example, but covers all embodiment variants. Thus, instead of the single balancing counterweight described above, the remote handling machine of the invention may include a set of two balancing counterweights and the hinge pin of the counterweight(s) may be offset with respect to the hinge pin of the gripping arm. In addition, the degree of freedom of rotation of the lower section 32 of the support 22 around the axis AA may be suppressed and the gripping arm 24 may have available degrees of freedom differing from those already described.

What is claimed is:

1. A handling machine for suspension from a horizontally movable lifting unit, comprising:

a support having an upper section and a lower section, a member mounted on said upper section by which said support can be suspended from said lifting unit;

a gripping arm including means pivotally attaching said arm to said lower section of said support, means for rotating said arm about a first horizontal axis, gripping pliers, means mounting said pliers on said arm for rotation around an actual axis of the arm perpendicular to said first horizontal axis, a first device to control the gripping action of the pliers and a second device to control rotation of the pliers around the actual axis of the arm;

counterweight means for balancing the gripping arm, means for pivotally attaching said counterweight means to said support for rotation about said first horizontal axis;

a first orientation control means to control the rotation of the gripping arm with respect to the support about said first horizontal axis;

a second orientation control means to control the rotation of said counterweight means with respect to the support about said first horizontal axis;

a slanting detection means to detect a slanting of the support around a second horizontal axis parallel to said first horizontal axis and passing through said member, said slanting detection means including means to produce signals that represent the amount of slanting of said support, means for connecting each of said orientation control means to said slanting detection means to receive signals therefrom, said orientation control means including means responsive to said signal to annul the slanting of said support;

means for pivotally mounting said lower section of said support to said upper section for rotation about a vertical axis perpendicular to said first and second horizontal axes; and third control means for rotating said lower section relative to said upper section about said vertical axis.

2. A handling machine according to claim 1, wherein the first and second orientation control means are back-gear motors mounted on said support.

3. A handling machine according to claim 1, wherein said detection device is sensitive to slanting of the support with respect to vertical.

4. A handling machine according to claim 1, wherein a potentiometer is connected to each of the orientation control means.

* * * * *